United States Patent [19]
Miyagawa

[11] 4,025,932
[45] May 24, 1977

[54] DATA RECORDING SYSTEM FOR CAMERA
[75] Inventor: Fumihiro Miyagawa, Yokohama, Japan
[73] Assignee: Ricoh Co., Ltd., Tokyo, Japan
[22] Filed: Jan. 15, 1975
[21] Appl. No.: 541,370
[30] Foreign Application Priority Data
 Jan. 16, 1974  Japan .................................. 49-7329
[52] U.S. Cl. ............................... 354/109; 354/105; 354/106; 354/108
[51] Int. Cl.² ......................................... G03B 17/24
[58] Field of Search .......... 354/105, 106, 107, 108, 354/109; 355/29, 39, 40

[56] References Cited
UNITED STATES PATENTS

| | | | |
|---|---|---|---|
| 3,590,703 | 7/1971 | Ono | 354/106 |
| 3,703,129 | 11/1972 | Goshima et al. | 354/106 |
| 3,812,508 | 5/1974 | Matsuda et al. | 354/106 |
| 3,831,183 | 8/1974 | Miyagawa | 354/109 |

Primary Examiner—Russell E. Adams
Attorney, Agent, or Firm—Frank J. Jordan

[57] ABSTRACT

Data such as the place and time a picture is taken are written on a tape in a data capsule which is detachably mounted in the camera body. A light source and an optical system are mounted in a hollow tube which is movable along the tape to scan the data and project the data onto an edge portion of the film when the camera shutter is opened. The tube has an aperture facing the film surface and another aperture facing the tape through which the image of the data passes. The aperture facing the tape is arranged very close to the surface of the tape so that light from the light source is prevented from being scattered into the body of the camera and adversely affecting the film.

14 Claims, 6 Drawing Figures

DATA RECORDING SYSTEM FOR CAMERA

The present invention relates to a system for a camera for recording data such as the place and time a photograph is taken on an edge portion of the film.

Systems for cameras are known in the art for recording the date a picture is taken on an edge portion of the film. Such a system is disclosed in U.S. Pat. No. 3,703,129 to Goshima et al., and includes a number of translucent tubes on which the numbers of years, months, and days are printed. The tubes are permanently mounted in the camera body and are rotatable by means of knobs protruding from the camera body so that the tubes may be aligned by the photographer to produce the desired date. The tubes are illuminated by a lamp mounted inside the tubes so that the date is visible from outside the tubes. An optical system is mounted outside the tubes to project the illuminated date onto the film. The lamp is automatically energized when the camera shutter is opened.

An improved version of the above system is disclosed in U.S. 3,739,687 to the present applicant. In this system, the date tubes, lamp, and a battery for the lamp are all incorporated into a data capsule which is detachably mounted in the camera to simplify fabrication, assembly maintenance, and to reduce the costs associated with these operations.

It is an object of the present invention to provide a data recording system for a camera by which not only a date, but any other desired information such as the place a photograph is taken, the names of persons in the photograph and the like may be easily recorded on an edge portion of the film to be visible in the photograph.

It is a further object of the present invention to provide a data recording system for a camera which is adapted to scan data in elongated form printed on a tape in a data capsule which is detachably mounted in the camera.

It is a further object of the persent invention to provide a data recording system for a camera comprising a data capsule containing a tape on which data to be recorded is printed which is detachably mounted in the camera and a tube housing an optical system and a light source to project an image of the data onto the film, an aperture in the tube facing the data being arranged in close proximity to the data capsule so that light from the light source is prevented from being scattered into the camera body to adversely affect the film.

The above and other objects, features and advantages of the present invention will become more clear from the following detailed description taken in conjunction with the accompanying drawings, in which.

Figure 1:
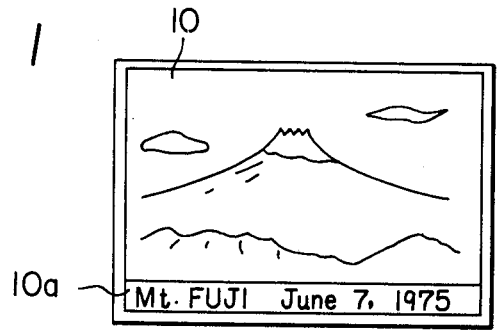
FIG. 1 is a graphic illustration of a photograph with data recorded on the lower edge portion thereof in accordance with the present invention.
Figure 2:
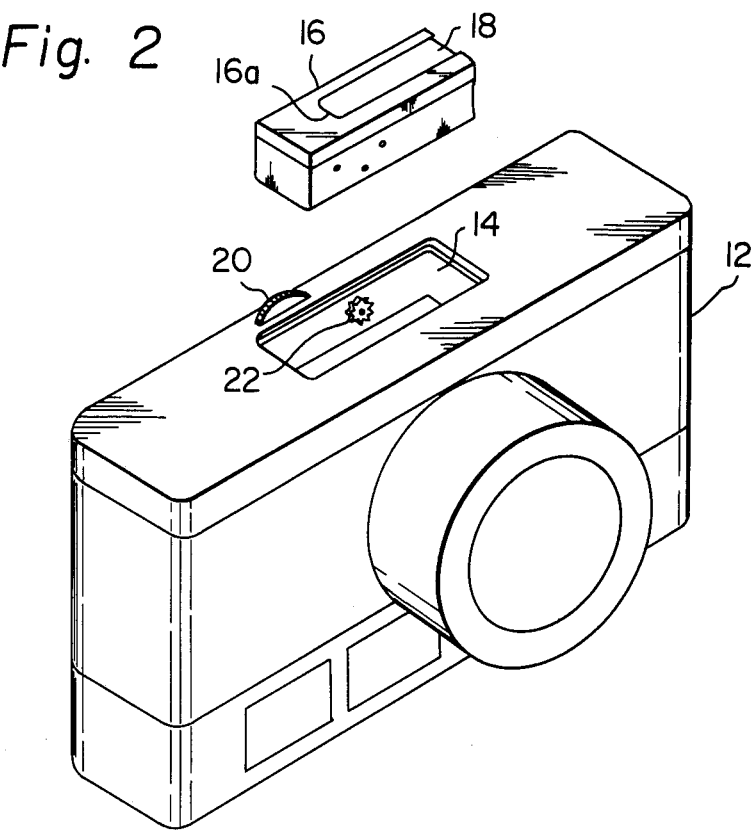
FIG. 2 is a perspective view of a camera and data capsule constituting part of a data recording system embodying the present invention.

Referring now to FIG. 1, one frame of film 10 has a lower edge portion 10a on which is recorded the place "Mt. Fuji" and the date "June 7, 1975" the photograph on the film was taken in accordance with the present invention. FIG. 2 shows a camera 12 of any suitable type formed with a recess 14 in its lower portion in which is detachably mountable a data capsule 16. The data capsule contains an elongated tape 18 on which desired data may be written or printed. The tape 18 may be changed by removing the data capsule 16 from the recess 14. The capsule 16 is formed with a slot 16a facing external of the camera 12 when the capsule 16 is mounted in the recess 14 through which data may be printed on the tape 18. The capsule 16 is also formed with a slot 16b (see FIG. 3) which faces the interior of the camera 12 when the capsule 16 is mounted in the recess 14. After printing the data to be recorded on the tape 18 through the slot 16a, the photographer may rotate a knob 20 which rotates a gear 22 which in turn rotates a gear wheel (not shown) in the data capsule 16 to move the portion of the tape 18 on which the data is printed to a position at which it is visible through the slot 16b.

Figure 3:
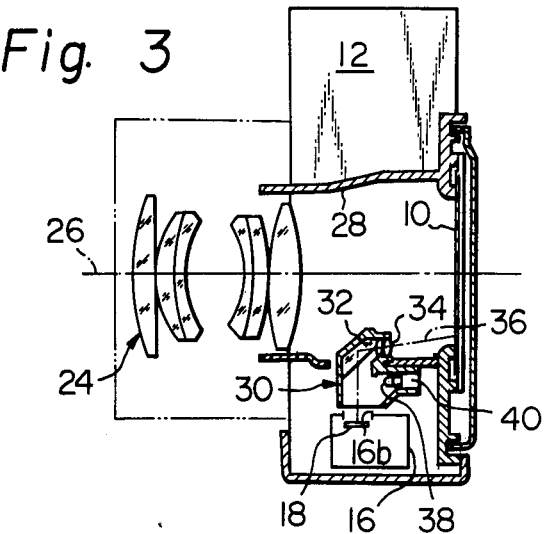
FIG. 3 is a sectional side view of the camera and data capsule shown in FIG. 2, and other parts of a data recording system embodying the present invention.

As shown in FIG. 3, the camera 12 includes a main lens 24 having an optical axis 26. A black baffle or camera obscura tube 28 is mounted in the camera 12 to prevent scattering of light from the lens 24. The film 10 is positioned behind the lens 24 in a conventional manner.

A data recording system according to the present invention comprises an enclosure or hollow tube 30 which is movably mounted in the camera 12. An optical system mounted in the tube 30 includes a reflector shown as a roof prism 32 and a lens 34 mounted between the prism 32 and the film 10 in the optical path axis 36 of the optical system. An illumination lamp 38 is mounted in a socket 40 within the tube 30 to illuminate the data on the tape 18.

Figure 4:
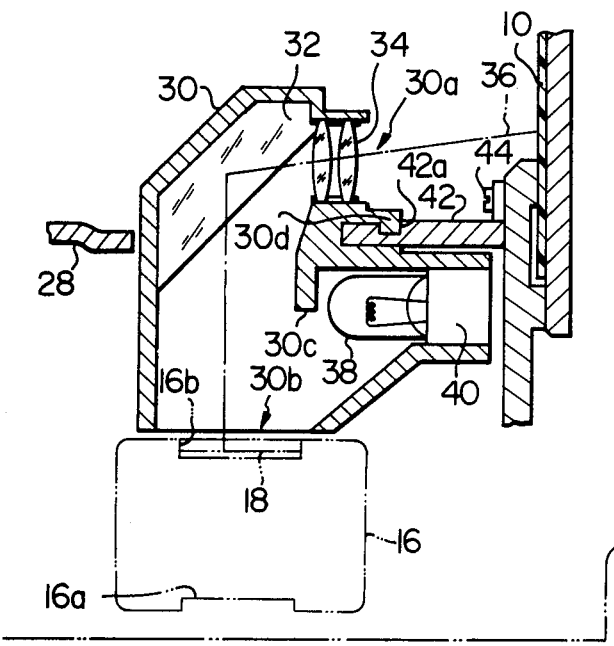
FIG. 4 is an enlarged view of the parts of the data recording system shown in FIG. 3.

Referring now to data FIG. 4, the tube 30 is formed with a first aperture 30a facing the film 10 and a second aperture 30b facing the tape 18 through the slot 16b. In accordance with an important feature of the present invention, the aperture 30b is arranged closely adjacent to the data capsule 16 to prevent light from the lamp 38 from being scattered into the interior of the camera 12 to adversely affect the film 10. It is well known to those skilled in the art of photography that if light from the lamp 38 were allowed to directly reach the film 10, it would fog the film 10 and thereby reduce the contrast of the resulting photograph. The tube 30 is formed with a protrusion 30c which acts as a baffle to allow light from the lamp 38 to illuminate the tape 18 through the slot 16b but prevent light from the lamp 38 from directly entering the optical system. It is clear that the optical path axis 36 passes through the apertures 30a and 30b.

A rail or track 42 is mounted within the camera by screws 44, and is formed with a groove 42a. The tube 30 is formed with a protrusion 30d which fits in the groove 42a so that the tube 30 is slidably and guidably mounted within the camera 12. As shown, the data capsule 16 is inserted in the camera 12 so that the surface of the tape 18 having the data printed thereon is perpendicular to the surface of the film 10. The angle between the tape 18 and the film 10 may be any desired value within the scope of the invention, and if the tape 18 and film 10 are substantially parallel, the prism 32 may be omitted. The optical path 36 is arranged to intersect the surface of the film 10 at an angle as close to 90° as possible to minimize distortion caused by a sloping image. This angle may vary from 90° to the extent within which the distortion is not unacceptably pronounced.

The track 42 is arranged parallel to the slot 16b of the capsule 16 so that the aperture 30b moves along the data on the tape 18 to scan the data as the tube 30 slides long the track 42. The track 42 is further arranged so that the aperture 30a of the tube 30 is movable parallel to both the surface and the lower edge of the film 10 corresponding to the edge portion 10a. It will be noticed that the aperture 30a of the tube is arranged adjacent to the edge of the film 10 closest to the data capsule 16 so that the axes 26 and 36 of the main lens 24 of the camera 12 and the optical system of the data recording system will not intersect during movement of the tube along the track 42.

Figure 5:
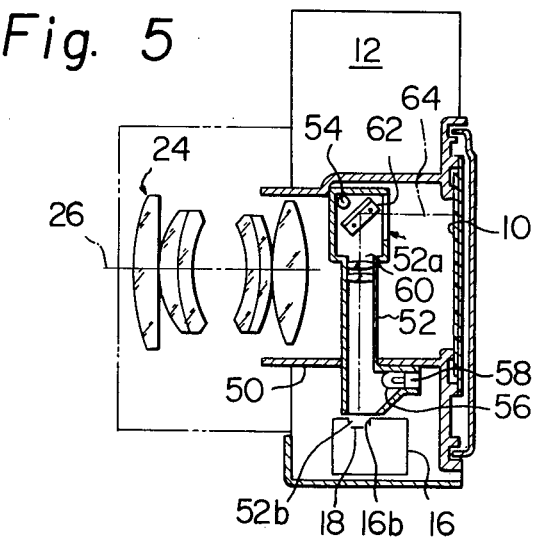
FIG. 5 is a sectional side view of the camera and data capsule shown in FIG. 2 and a modified embodiment of the parts of the data recording system shown in FIG. 3.

A modified version of the data recording system shown in FIGS. 3 and 4 is illustrated in FIG. 5. The baffle for the lens 24 is designated as 50. An enclosure or tube 52 which performs the same function as the tube 30 is slidably guided by a member (not shown) in the camera 12 and movable by means of a worm 54. The tube 52 is formed with a first aperture 52a facing the upper edge of the film 10 and a second aperture 52b facing the tape 18 through the slot 16b in the data capsule 16. As in the previous embodiment, the aperture 52b is arranged very close to the surface of the tape 18 to prevent scattering of light from a lamp 56 mounted in a socket 58 in the tube 52 into the interior of the camera 12. An optical system mounted in the tube 52 includes a lens 60 and a plane mirror 62. In this case, the mirror 62 is mounted between the lens 60 and the film 10 in the optical path axis 64 of the optical system. The first aperture 52a is arranged adjacent to the edge of the film 10 farthest from the data capsule 17. The guide member and worm 54 are arranged so that the tube 52 is movable in a path similar to that of the tube 30 of the previous embodiment, and the axes 26 and 64 of the main lens 24 and optical system of the data recording system will intersect during movement of the tube 52.

Figure 6:
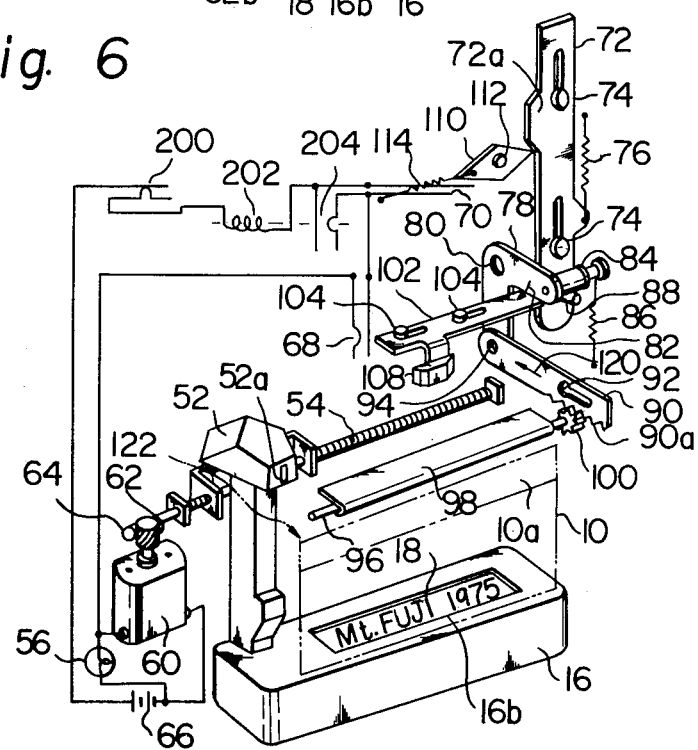
FIG. 6 is a perspective view of a complete data recording system including drive means and the parts of the system shown in FIG. 5.

A drive system for moving the tube 30 or 52 and energizing the lamp 38 or 56 is shown in FIG. 6, ane is actuated by the shutter mechanism of the camera 12. Although the drive system is shown in conjunction with the tube it may also be utilized to move the tube 30.

The worm 54 is rotatable by a motor 60 through gears 62 and 64. The motor 60 is connected in series with a battery 66, normally open switches 68 and 70, a relay coil 202 and a normally closed limit switch 200. Normally open contacts 204 of the relay coil 202 are connected in parallel with the switch 70. The limit of switch 200 is arranged to be opened by the tube 52 when the tube reaches its rightmost position as shown in FIG. 6. The lamp 56 is connected in parallel with the motor 60. When energized, the motor 60 is driven in a direction to move the tube 52 rightward. A coil spring (not shown) is provided to the motor 60 to urge the motor 60 to drive in a direction to move the tube 52 to its leftmost position. A sliding link 72 is linearly slidably mounted in the camera 12 by means of slots amd fixed pins 74, and is biased upward by a tension spring 76. The link 72 is operatively connected to the camera shutter mechanism, and arranged to be moved downward against the force of the spring 76 when the camera shutter release button (not shown) is depressed. A bell crank lever 78 is pivotal about a fixed pin 80, and has a roller 84 rotatably attached to the end of the upper arm. The roller 84 and lever 78 are biased in the direcion of an arrow 82 by a tension spring 86 into engagement with a pin 88 fixed to the link 72. The force of the spring 76 is stronger than that of the spring 86 so that the link 72 and lever 78 are normally in the position shown in FIG. 6.

A link 90 is movably connected within the camera 12 by a slot and fixed pin 92, and is pivotally connected at one end to the end of the lower arm of the lever 78 by a pin 94. A shaft 96 is rotatably mounted within the camera 12 and carries a shutter plate 98. A pinion 100 is fixed to one end of the shaft 96 and meshes with a rack 90a formed on the link 90. The link 90 and shaft 96 are normally in the positions shown in FIG. 6.

A changeover link 102 is linearly slidably mounted in the camera 12 by slots and fixed pins 104, and has a changeover knob fixed thereto and extending externally from the camera 12. When the knob 108 and link 102 are in the rightmost positions as shown, the right end of the link 102 is disposed under the upper arm of the lever 78 so that the lever 78, link 90, shaft 96 and shutter plate 98 may not be moved from the positions shown even when the link 72 is moved downward. When the knob 108 and link 102 are moved to their leftmost positions (not shown), the right end of the link 102 will move out from under the upper arm of the lever 78 so that the lever 78 may be rotated in the direction of the arrow 82 when the link 712 is moved downward. The left end of the link 102 engages with the switch 68, which is normally open, to close the switch 68.

A diamond shaped lever 110 is pivotally mounted wihin the camera 12 by a pin 112, and is biased to the position shown in FIG. 6 by a tension spring 114. The link 72 is formed with a protrusion 72a adapted to engage with the right end of the lever 110. Upon return movement of the link 72, the left end of the link 110 will engage with the switch 70, which is normally open, to close the switch 70 as will be described in detail below.

The provision of the knob 108 and link 102 allows the photographer to select whether or not to record data on the film 10. If he does not want to record data, he moves the knob 108 to the right most position. The left end of the link 102, disengages from the switch 68 so that the switch 68 is opened and the motor 60 may not be energized. The tube 52 therefore remains in the position shown. The right end of the link 102 is positioned under the upper arm of the lever 78. When the shutter release button is depessed the link 72 will be moved downward. However, the lever 78 and thereby the link 90 and shaft 96 will be prevented from moving from the positions shown, and the shutter plate 98 will uncover the edge portion 10a of the film 10 so that when the camera shutter is opened the image from the lens 24 will fill the entire frame of the film 10 including the edge portion 10a. The camera 12 will thus operate as a conventional camera without recording data.

When the photographer desires to record the data printed on the tape 16, he moves the knob 108 to the leftmost position. The left end of the link 102 engages with the switch 68 to close the same. The right end of the link 102 disengages from the lever 78 to allow rotation of the lever 78.

When the photographer depresses the shutter release button, the link 72 is moved downward so that the lever 78 is rotated in the direction of the arrow 82 by the spring 86. This causes the link 90 to move in the direction of an arrow 120 and the shaft 96 to be rotated in the direction of an arrow 122 by the rack 90a and pinion 100. The shutter plate 98 is thereby moved to a position in front of the edge portion 10a of the film 10 to cover the same.

When the link 72 reaches its lowermost postion, the camera shutter (not shown) is opened to expose the film 10 through the lens 24. The portion 10a will not be exposed since it is covered by the shutter plate 98. During the downward movement of the link 72, the lower edge of the protrusion 72a engages with the right end of the lever 110 to rotate the lever 110 clockwise as viewed in FIG. 6. However, this movement will not cause the lever 110 to engage with the switch 70, and the switch 70 will remain open.

When photographer releases the shutter release button, the link 72, lever 78, link 90, shaft 96 and shutter plate 98 will be returned to the positions shown in FIG. 6 by the spring 76, with the shutter plate 98 uncovering the edge portion 10a of the film 10. During the upward or return movement of the link 72, the upper edge of the protrusion 72a engages with the lever 110 to rotate the lever 110 counterclockwise to engage with the switch 70 and momentarily close the switch 70. This completes a circuit with the battery 66, the parallel combination of the motor 60 and lamp 56, the switches 68 and 70, the relay coil 202 and the limit switch 200. Energization of the relay coil 202 causes the contacts 204 to close and maintain the close circuit after the link 72 is returned to its uppermost position and the protrusion 72a disengages from the lever 110 and the switch 70 is opened. Energization of the lamp 56 causes illumination of the data on the tape 18. Energization of the motor 60 causes the tube 52 to moved rightward against the force of the coil spring (not shown) so that the aperture 52b sweeps over the data to scan the data. As a result of the scanning operation, the optical system projects the data onto the edge portion 10a of the film 10 to expose the film 10 and record the data theron. When the tube 52 reaches its rightmost position after sweeping the entire length of the data on the tube 18, it engages with the limit switch 200 to momentarily open the switch 200. This opens the circuit and deenergizes the relay coil 202 which allows the contacts 204 to open. The motor 60 and lamp 56 are de-energized, and the tube 52 is returned to its leftmost position by the coil spring in preparation for another data recording operation.

It will be understood that the data recording systems shown and described are examples illustrating practical embodiments of the present invention, and should not be taken as limiting the scope thereof.

The drive system shown may be replaced by any drive system operative to energize the illumination lamp and move the enclosure or tube in the desired manner. As another possible modification, an auxiliary switch may be provided to actuate the drive motor for the tube and the lamp, although not shown, which is independent of the shutter mechanism of the camera. This would reduce the precision required in manufacturing the camera and also the manufacturing cost to provide a more inexpensive camera for amateur photography. It will also be realized that a system of the present invention may adapted to record the data on the film margin rather than the picture area. In such a case, a mechanism to select whether or not to record the data may be eliminated, and the drive means may consist of only a motor to drive the tube and switch means to energize the motor and lamp.

What is claimed is:

1. A data recording system for use with a camera having a camera lens and a shutter mechanism operating a shutter comprising, in combination:

data means detachably mounted in the camera on which data to be recorded is printed;

illumination means to illuminate the data on the data means;

optical means to project an image of the data onto a film surface, said optical means comprising a lens to focus the data onto the film surface and a reflector to reflect the image of the data so that the image is incident on the film surface at substantially a right angle;

enclosure means operatively arranged within the camera to be moved aong the data to scan the data, the illumination and optical means being mounted within the enclosure means, the enclosure means comprising means defining a first aperture facing the film surface through which the image is projected onto the film surface by the optical means, means defining a second aperture closely adjacent to the data on the data means through which the data is illuminated by the illumination means and is visible to the optical means, and baffle means to prevent light from the illumination means from directly entering the optical means;

drive means actuated by the camera shutter mechanism to energize the illumination means and move the enclosure means when the camera shutter is opened, the drive means comprising a sliding link operatively connected to the camera shutter mechanism, a changeover link to select whether or not to record the data on the film, a shutter operatively connected to the sliding link to cover a portion of the film surface on which the data is recorded when the camera shutter is opened, and an electrical circuit comprising a power source to energize the illumination means and a motor for moving the enclosure means, a first normally open switch which is closed by the changeover link when the date is recorded on the film and a second normally open switch which is closed by the sliding link; and rail or track means by which the enclosure means is slidably mounted within the camera.

2. The data recording system according to claim 1, in which the data means is a data capsule.

3. The data recording system according to claim 1, in which the data is in elongated form.

4. The data recording system according to claim 1, in which the reflector is arranged between the lens of the optical means and the film surface in the optical path of the optical means.

5. The data recording system according to claim 1, in which the lens of the optical means is arranged between the reflector and the film surface in the optical path of the optical means.

6. The data recording system according to claim 2, in which the data capsule comprises a tape on which the data is printed.

7. The data recording system according to claim 1, in which the enclosure means is moved parallel to the film surface.

8. The data recording system according to claim 7, in which the enclosure means is further moved parallel to an edge of the film surface.

9. The data recording system according to claim 8, in which the first aperture means is arranged adjacent to the edge portion of the film surface closest to the data means.

10. The data recording system according to claim 8, in which the first aperture means is arranged adjacent to the edge portion of the film surface farthest from the data means, the optical means and the camera lens intersecting as the enclosure means is moved.

11. The data recording system according to claim 1, in which the enclosure means comprises a hollow tube.

12. The data recording system according to claim 1, in which the drive means further comprises a linkage disposed between the sliding link and the shutter plate, the linkage comprising a bellcrank lever operatively engaged with the sliding link and a link pivotally connected to the bellcrank lever and operatively engaged with the shutter plate.

13. The data recording system according to claim 12, in which the drive means further comprises a lever to close the second normally open switch.

14. The data recording system according to claim 1, in which the electrical circuit further comprises a relay coil having normally open contacts to keep the circuit closed and a normally open closed limit switch to open the circuit after the data is scanned.

* * * * *